United States Patent [19]

Smith, Jr.

[11] Patent Number: 5,054,384

[45] Date of Patent: Oct. 8, 1991

[54] SYSTEM FOR FILLING COOKING PANS WITH EGGS

[75] Inventor: Richard M. Smith, Jr., Newbury Park, Calif.

[73] Assignee: Louis D. Dunckel, Oxford, N.Y.

[21] Appl. No.: 419,272

[22] Filed: Oct. 10, 1989

[51] Int. Cl.⁵ .......................... A23J 1/00; A47J 29/00; A47J 37/10

[52] U.S. Cl. ...................................... 99/335; 99/353; 99/423; 99/427; 99/448; 99/452; 99/497; 99/568

[58] Field of Search .................. 99/334, 335, 353–355, 99/495–498, 507, 568, 357, 484, 423, 427, 443 C, 448, 452; 426/482, 523

[56] References Cited

U.S. PATENT DOCUMENTS

| | | | |
|---|---|---|---|
| 2,369,274 | 2/1945 | Beatty | 99/423 |
| 3,147,783 | 9/1964 | Noltes | 99/568 X |
| 3,264,974 | 8/1966 | Miller et al. | 99/423 |
| 3,714,888 | 2/1973 | Tanguy et al. | 99/355 |
| 3,958,505 | 5/1976 | Baker | 99/495 |
| 4,110,223 | 8/1978 | McAleer et al. | 99/498 |
| 4,555,985 | 12/1985 | Pacquet | 99/443 C |

FOREIGN PATENT DOCUMENTS 7701827  8/1978  Netherlands ........................ 99/568

Primary Examiner—Timothy F. Simone
Attorney, Agent, or Firm—Jones, Tullar & Cooper

[57] ABSTRACT

A cooking pan filling system for an automated egg cooking process is disclosed wherein whole eggs are removed from their shells and transferred to a plurality of conveyed cooking pans intact without yolk breakage or separation of the egg yolks from the egg whites. A microprocessor based control unit causes the system to sequentially add a release agent and additional egg white to the cooking pans before the whole eggs are dispensed from a reservoir into the pans. A nondestructive valve mechanism insures that the whole eggs will not be damaged as they are dispensed from the reservoir into the pans. Alternatively, the whole eggs are mixed before they are dispensed into the pans to make scrambled eggs.

9 Claims, 2 Drawing Sheets

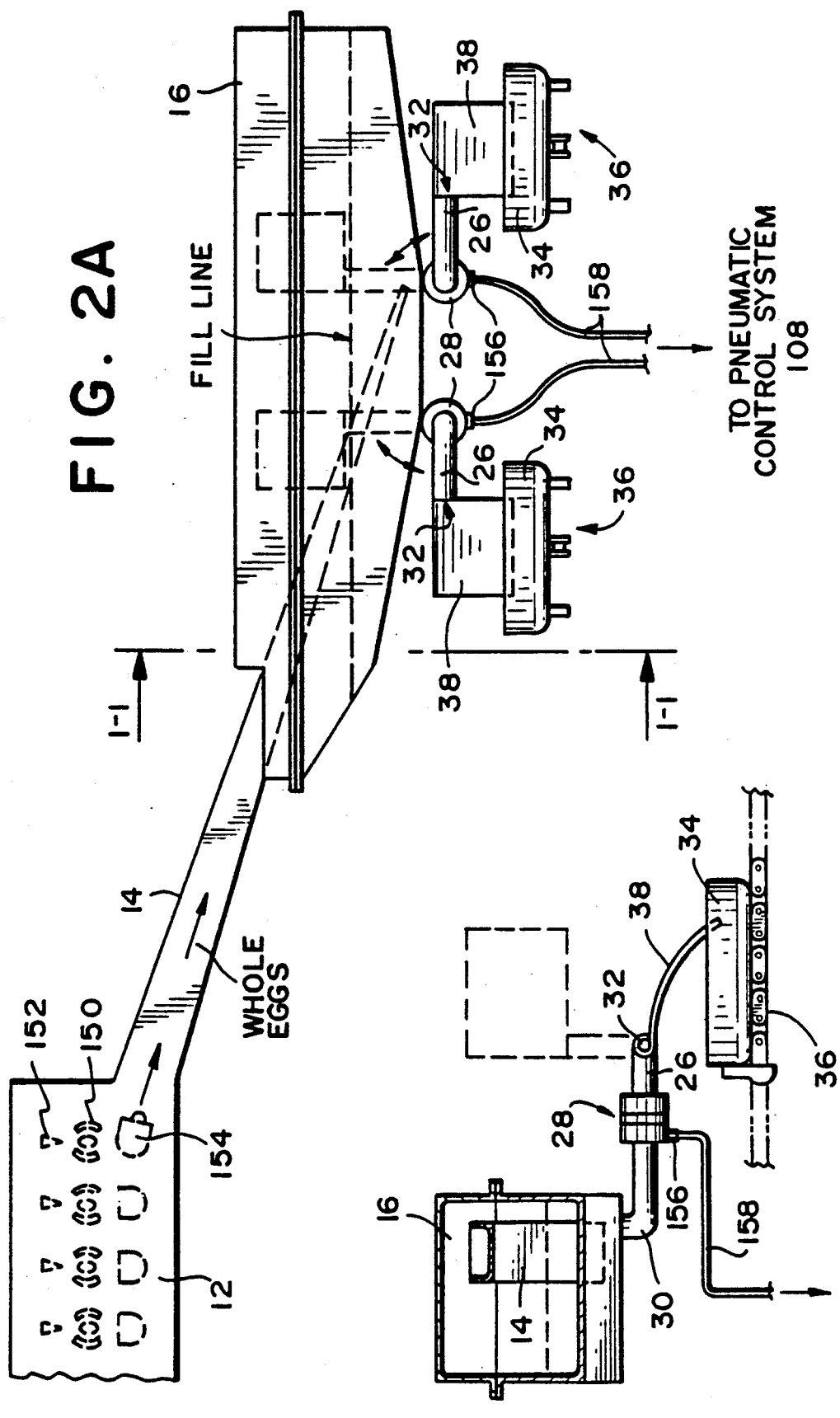

SYSTEM FOR FILLING COOKING PANS WITH EGGS

BACKGROUND OF THE INVENTION

The present invention relates to a system for filling cooking pans with eggs to be cooked in an automated egg cooking process. The invention is related to the invention set forth in U.S. patent application Ser. No. 07/419,273, pending to Louis D. Dunckel, entitled "Egg Cooking and Packaging Process and Apparatus", which was filed on the same date as the present application.

In the Dunckel application, an automated egg cooking and packaging process and apparatus are disclosed in which eggs are removed from their shells, transferred to a plurality of cooking pans, cooked and then packaged. In a first mode of operation, the deshelled eggs are transferred to the cooking pans whole and intact In a second mode of operation, the deshelled eggs are mixed and then transferred to the cooking pans so that scrambled eggs may be formed. The cooking and packaging process further envisions that additional egg white may be added to the eggs to be cooked to reduce the cholesterol level per serving. In the first mode of operation, this additional egg white is added to the cooking pans before the whole eggs are dispensed therein to act as an additional cushioning means to insure that the egg yolks will not be broken.

SUMMARY OF THE INVENTION

It is the object of the present invention to provide a system for filling pans with eggs to be cooked in an automated egg cooking process.

It is the further object of the present invention to provide a system for filling pans with eggs to be cooked in an automated egg cooking process in which deshelled whole eggs are transferred intact to a plurality of cooking pans.

It is another object of the present invention to provide a cooking pan filling system for an automated egg cooking and packaging process wherein a plurality of cooking pans can be sequentially loaded with predetermined quantities of whole or mixed eggs and additional egg whites.

These and other objects of the invention are achieved with a cooking pan filling system that includes a whole egg reservoir which receives deshelled intact whole eggs from a conventional egg breaker machine. This reservoir is positioned above a conveyor along which the cooking pans to be loaded move. A pair of pneumatically actuated dispensing valves are employed to transfer the whole eggs from the reservoir to the cooking pans as the pans pass beneath the reservoir. These valves are designed specifically so that they will not damage the yolks of the eggs as they pass through, and do not include any type of gate or similar shutoff means. Instead, the nondestructive valve mechanisms each include a dispensing tube that is connected through a rotary coupling to a fixed tube, which in turn is connected to an opening disposed in the bottom of reservoir. Each of the dispensing tubes has a discharge opening, and the tubes are positionable in a first position where the opening is above the level of the eggs in the reservoir and in a second position in which the opening is positioned below the level of the eggs in the reservoir and directly above the cooking pans. Thus, in the first position the valve is closed and in the second position the valve is opened. To further insure that the eggs will not be damaged as they are dispensed into the cooking pans, a deflector plate is attached to each of the dispensing tubes adjacent the discharge opening for guiding the eggs gently into the pans.

A microprocessor based control unit for the pan filler system controls the actuation of the reservoir dispensing valves. In addition, the control unit controls the actuation of other valves for dispensing an anti-stick or release agent and additional egg whites into the cooking pans before the whole eggs are dispensed therein. The additional egg white is added to lower the cholesterol content per serving of the cooked eggs, and the quantity of additional egg white can be selected as desired through the control unit. Numerous sensors are disposed along the length of the system conveyor to provide signals to the control unit regarding the positioning of the cooking pans and the weight of the eggs loaded into the pans. A timing circuit connected to the control unit provides signals for controlling the sequential operation of the various elements of the system.

BRIEF DESCRIPTION OF THE DRAWINGS

The foregoing and additional objects, features and advantages of the invention will become apparent to those of skill in the art from the following more detailed consideration thereof taken in conjunction with the accompanying drawings in which:

FIGS. 2A and 2B are diagrammatic front and side views, respectively, of a portion of the pan filling system including an egg reservoir and dispensing valves therefore, with the reservoir being shown in cross section in FIG. 2B taken along line 1—1 of FIG. 2A.

DETAILED DESCRIPTION OF THE PREFERRED EMBODIMENT

Figure 1:
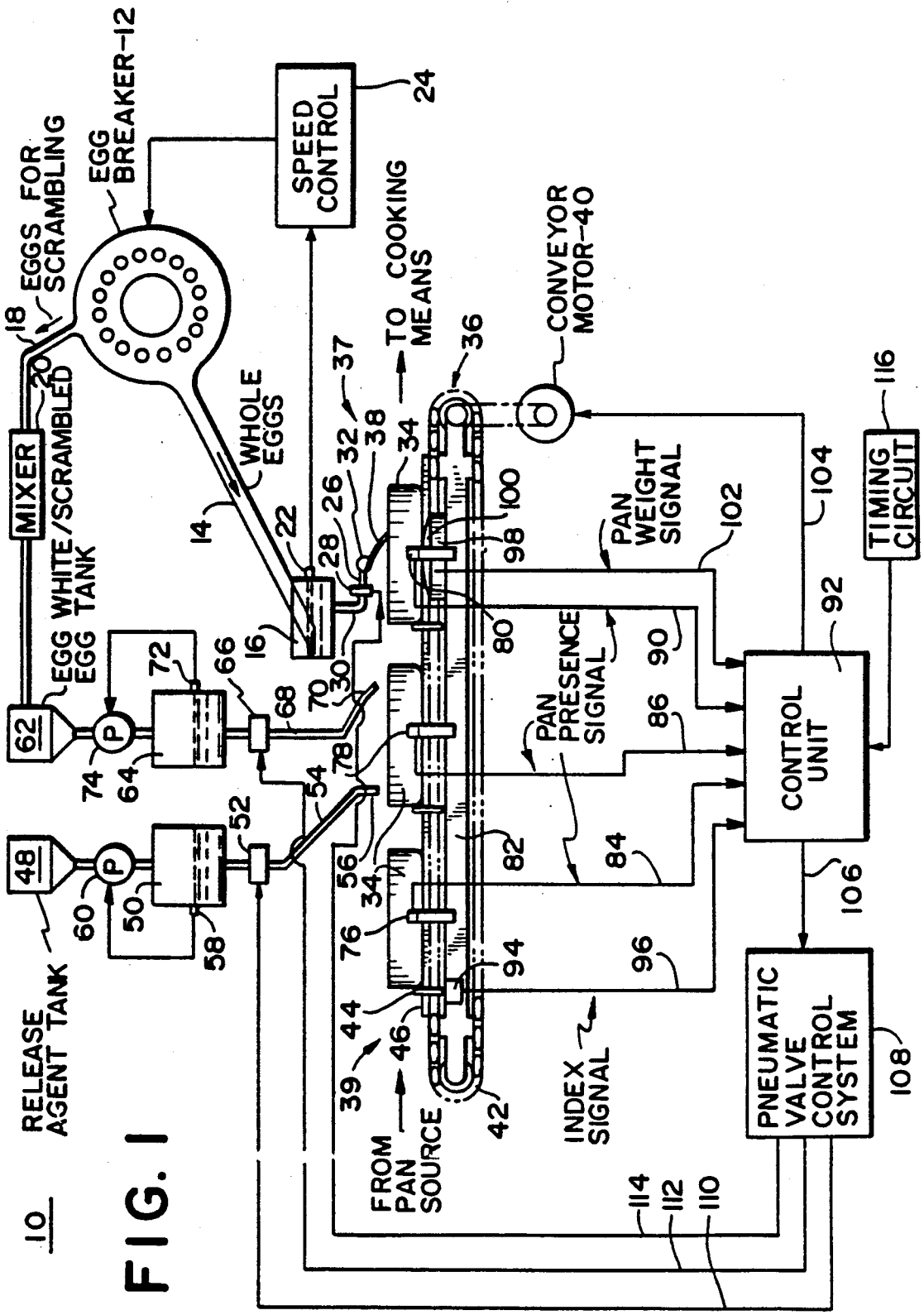
FIG. 1 is a schematic diagram of the cooking pan filling system.

Turning now to a more detailed consideration of the present invention; there is illustrated FIG. 1, a cooking pan filling system 10 which includes an egg breaker 12 for receiving fresh eggs from a source (not shown), removing their shells and directing the eggs to one of two destinations. The egg breaker 12 is of conventional construction and by way of example can be a Sanovo Model 3000. The egg breaker 12 serves to remove the shells from the eggs without breaking their yolks or separating their yolks from their whites. These deshelled intact whole eggs are transferred gently down a chute 14 to a whole egg reservoir 16 to be discussed in greater detail in conjunction with FIG. 2. Alternatively, the eggs may be directed down a second chute 18 to a mixer 20 which is used when scrambled eggs are to be cooked.

A level sensor 22 is disposed on the whole egg reservoir 16 which sends a signal in response to the level of the eggs in the reservoir 16 to a speed control mechanism 24 for the egg breaker 12. The speed control mechanism 24 adjusts the speed of the egg breaker 12 as necessary to maintain a desired level, and therefore head pressure, within the whole egg reservoir 16.

A whole egg dispensing tube 26 is connected through a pneumatically actuated rotary coupling 28 to a fixed tube 30, which in turn is connect to an opening disposed in the bottom of the whole egg reservoir 16. The whole egg dispensing tube 26 has a discharge opening 32 for dispensing whole eggs into a plurality of egg cooking pans 34 as they pass beneath the reservoir 16 on a chain type conveyor 36. The whole egg dispensing tube 26 is positioned near a downstream end 37 of the conveyor 36. A curved deflector plate 38 is attached to the whole egg dispensing tube 26 near the opening 32 which acts as a guide to direct the whole eggs gently into the pans 34 without damaging them.

Each of the pans 34 enters an upstream end 39 of the conveyor 36 from a pan source (not shown), and is conveyed along the chain type conveyor 36 by means of a conveyor motor 40. A chain 42 for the conveyor 36 has a plurality of pan pusher elements 44 attached thereto which engage the pans 34 and push them along a conveyor rail 46.

A release agent tank 48 is connected to a release agent reservoir 50, which in turn is connected through a pneumatic control valve 52 to a release agent dispensing tube 54 having a tip 56 positioned above the conveyor 36 near the upstream end 39 thereof. A release agent reservoir level sensor 58 provides a signal to a release agent pump 60 to maintain a constant level, and therefore head pressure, within the release agent reservoir 50.

Similarly, an egg white/scrambled egg tank 62 is connected to an egg white reservoir 64, which in turn is connected through a pneumatic control valve 66 to an egg white dispensing tube 68 that is positioned above the conveyor 36 at a point between the release agent dispensing tube 54 and the whole egg dispensing tube 26. A tip 70 of the dispensing tube 68 is formed, sized and positioned such that egg white liquid dispensed therefrom impinges high on the interior sidewall of the egg pans 34 and flows into the pan cavities. An egg white reservoir level sensor 72 provides signals to an egg white pump 74 to maintain the level, and therefore head pressure, constant in the egg white reservoir 64. The egg white/scrambled egg tank 62 is either filled with egg white from a source (not shown), mixed whole eggs from the mixer 20, or a proportional mixture of both.

A plurality of infrared pan presence sensors 76, 78 and 80 are attached to a conveyor frame 82. The outputs from these sensors are fed via a plurality of lines 84, 86 and 90, respectively, to a microprocessor based control unit 92 for the pan filling system. An index sensor 94 is also positioned on the frame 82 for sensing the presence of each of the pan pusher elements 44. The output from the sensor 94 is fed via a line 96 to the control unit 92.

A pan weight scale 98 is disposed along the conveyor 36 beneath the dispensing tube 26 for the whole egg reservoir 16. A plurality of pan support blocks 100 are disposed on top of the scale 98 which act to lift the pans 34 off of the conveyor rail 46 so that their full weight will be placed on the weight scale 98. The output from the scale 98 is fed through a line 102 to the control unit 92.

The control unit 92 provides two main outputs. A first output 104 provides control signals to the conveyor motor 40 and a second output 106 provides control signals to a pneumatic valve control system 108. In response to the control signals, the valve control system 108 selectively actuates the pneumatically actuated valves 52, 66 and 28, through a plurality of pneumatic lines 110, 112 and 114, respectively. A timing circuit 116 is connected to the control unit 92 to provide timing signals for the conveyor motor 40 and the valve control system 108.

Turning now to FIGS. 2A and 2B, the whole egg reservoir 16 and associated elements are illustrated in greater detail. The conventional egg breaker 12 includes a plurality of egg holding elements 150, a plurality of corresponding egg shell breaking knives 152 and a plurality of corresponding whole egg receiving cups 154. As the egg breaker operates, the knives 152 break the shells, and the whole eggs are received in the cups 154. In the Sanovo Model 3000 rotary egg breaker, a manually selectable cup dumping mechanism (not shown) causes each of the cups 154 to dump their contents at the desired location, such as the chute 14 for whole eggs, or the chute 18 in FIG. 1 for eggs with broken yolks or eggs to be scrambled.

As also shown in FIG. 2A, the whole egg reservoir 16 receives eggs from the egg breaker 12 through the chute 14. The chute 14 extends downward at an angle into the reservoir 16 and terminates near the bottom thereof so that eggs will slide gently into the reservoir 16 and the risk of yolk breakage is minimized. During normal operation, the reservoir 16 is filled with whole eggs up to a level indicated by the dashed fill line in FIGS. 2A and 2B. This level is controlled by the level sensor 22 and egg breaker speed control 24 as in discussed in detail previously in conjunction with FIG. 1.

As indicated by the dashed lines in FIGS. 2A and 2B, the rotary couplings 28 enable the whole egg dispensing tubes 26 to be moved to two positions. In a first position as illustrated by the solid lines, the tubes 26 are horizontal, and their discharge openings 32 are positioned beneath the fill line level in the reservoir 16 so that eggs will be dispensed through the openings 32. In the second position as illustrated by the dashed lines, the dispensing tubes 26 are pivoted 90° about a horizontal axis so that the discharge openings 32 are pointed upward and are positioned at a level above that of the fill line in the reservoir 16. This prevents eggs from exiting the dispensing tubes 26 when the pans 34 are not yet in position beneath the reservoir 16, and provides the important advantage of not requiring any type of gate type shutoff valve for the dispensing tubes 26. Such a valve could break the yolks of eggs as they are dispensed and contaminate the entire batch of eggs in the pan 34. The rotary action of the couplings 28 can be carried out in any suitable manner, but preferably is accomplished pneumatically. In this case, the rotary couplings 28 are conventional pneumatically operated couplings and each have a connection 156 connected to a pneumatic line 158 that is connected to the pneumatic valve control system 108 for controlling the position of the white egg dispensing tubes 26.

The operation of the pan filling system will now be described. Referencing once again FIG. 1, as one of the pans 34 enters the conveyor 36 from the pan source, its corresponding pusher element 44 will pass the index sensor 94. This will send a signal to the control unit 92 which will cause the conveyor motor 40 to stop. After a time period determined by the timing circuit 116, the conveyor motor 40 will once again start and advance the pan 34. As the trailing edge of the pan 34 passes by the first pan presence sensor 76, a signal will be sent from the control unit 92 to the valve control system 108 to cause the release agent valve 52 to open and coat the interior of the pan 34 with the release agent. This continues until the next pan pusher element 40 for the next pan 34 passes the index sensor 94, at which time the release agent valve 52 is closed, and the conveyor motor 40 is stopped for another timed cycle. The generation of the pusher element's sensing signal by the index sensor 94 and a pan presence signal form the second pan sensor 78 causes the egg white valve 66 to be opened so that egg white is now dispensed into the pan. The timing circuit 116 provides an adjustable time period during which the egg white dispensing valve 66 is opened so that a predetermined quantity of egg white is dispensed into the pan 34. This quantity is selected to provide a desired egg white to yolk ratio, and thus a desired cholesterol level per serving.

During the next pan advancing cycle, the pan 34 passes beneath the whole egg dispensing tube 26. When a signal is received from the third pan sensor 80 indicating that the pan is present beneath the dispensing tube 26 and the index sensor 94 sends a signal indicating that another pusher element 44 is adjacent thereto, the conveyor motor 40 is once again stopped and a signal is sent to the valve control system 108 to cause the pneumatically actuated rotary coupling 28 to pivot the whole egg dispensing tube 26 downward so that whole eggs will flow gently into the pan 34 on top of the egg white already contained therein. Once a predetermined weight of whole eggs has been dispensed into the pan 34 as sensed by the signal sent from the weigh scale 98, the control unit 92 sends a signal to the valve control system 108 to raise the dispensing tube 26 and terminate the filling of the pan 34. The loaded pan 34 is then ready to be conveyed to a cooking means (not shown). In the alternative mode of operation where mixed eggs are dispensed into the pans 34 from the egg white/scrambled egg tank 62, the control unit 92 causes the whole egg dispensing tube 26 to remain in the up position so that whole eggs will not be dispensed from the whole egg reservoir 16 into the pans 34. Instead, the pans 34 are loaded solely from the egg white dispensing tube 68 which in this case, dispenses mixed whole eggs.

Although the invention has been disclosed in terms of a preferred embodiment, it will be understood that numerous modifications and variations could be made thereto without departing from true spirit and scope thereof as defined in the following claims.

I claim:

1. A system for filling cooking pans with eggs comprising:
   a) a reservoir for a plurality of deshelled intact whole eggs;
   b) at least a first whole egg dispensing tube having an opening for dispensing said deshelled intact whole eggs from said reservoir into a plurality of cooking pans; and,
   c) a first valve means connected between said reservoir and said whole egg dispensing tube for selectively dispensing said eggs through said dispensing tube; said first valve means comprising:
   a rotary coupling disposed between said reservoir and said whole egg dispensing tube for selectively positioning the whole egg dispensing tube in a first position where said opening is positioned so that eggs will be dispensed therefrom, and in a second position in which said opening is elevated so that eggs will not be dispensed therefrom.

2. The system of claim 1 further comprising a deflector plate disposed on said whole egg dispensing tube adjacent said opening to guide the dispensed eggs.

3. The system of claim 1 further comprising actuating means for said rotary coupling to selectively position said whole egg dispensing tube in said first and said second positions.

4. A system for filling cooking pans with eggs comprising:
   a) a reservoir for a plurality of deshelled intact whole eggs;
   b) at least a first whole egg dispensing tube having an opening for dispensing said deshelled intact whole eggs from said reservoir into a plurality of cooking pans;
   c) a first valve means connected between said reservoir and said whole egg dispensing tube for selectively dispensing said eggs through said dispensing tube;
   d) a pan conveyor for conveying cooking pans beneath the reservoir and said whole egg dispensing tube;
   e) means to advance said pan conveyor selectively;
   f) means to actuate said first valve means selectively to dispense whole eggs through said whole egg dispensing tube; and,
   g) a control means connected to said means to advance and said means to actuate for advancing cooking pans beneath said whole egg dispensing tube and loading them with eggs from said whole egg reservoir.

5. The system of claim 4, further comprising:
   h) a pan weigh scale disposed along said pan conveyor beneath said whole egg dispensing tube for weighing a cooking pan as it is loaded with eggs from said reservoir, said weigh scale having an electrical output that is connected to said control unit and causes said control unit to deactuate said first valve means when a predetermined quantity of eggs is loaded into a cooking pan.

6. The system of claim 5, further comprising:
   i) at least a first sensor means disposed along said pan conveyor for sensing the position of a cooking pan on said conveyor, said sensor means having an output connected to said control unit.

7. A system for filling cooking pans with eggs comprising:
   a) a reservoir for a plurality of deshelled intact whole eggs;
   b) at least a first whole egg dispensing tube having an opening for dispensing said deshelled intact whole eggs from said reservoir into a plurality of cooking pans;
   c) a first valve means connected between said reservoir and said whole egg dispensing tube for selectively dispensing said eggs through said dispensing tube;
   d) a pan conveyor for conveying cooking pans beneath the reservoir and said whole egg dispensing tube;
   e) means to advance said pan conveyor selectively;
   f) an egg white reservoir for receiving a quantity of egg white;
   g) an egg white dispensing tube positioned above said pan conveyor at a point upstream from said whole egg dispensing tube for dispensing egg white from said egg white reservoir into a cooking pan on said pan conveyor;
   h) a second valve means connected between said egg white reservoir and said egg white dispensing tube;
   i) means to actuate said first valve means selectively to dispense whole eggs through said whole egg dispensing tube;

j) means to actuate said second valve means selectively to dispense egg whites through said egg white dispensing tube; and,
k) a control means connected to said means to advance, said means to actuate said first valve means and said means to actuate said second valve means for sequentially advancing a cooking pan beneath said egg white dispensing tube, dispensing a predetermined quantity of egg white into a cooking pan, advancing an egg white containing pan beneath said egg dispensing tube, and dispensing whole eggs into an egg white containing cooking pan.

8. The system of claim 7, further comprising:
l) a release agent reservoir;
m) a release agent dispensing tube positioned above said pan conveyor at a point upstream from said egg white dispensing tube;
n) a third valve means connected between said release agent reservoir and said release agent dispensing tube; and,
o) means connected to said control means to actuate said third valve means selectively to dispense release agent through the release agent dispensing tube into an empty cooking pan on said pan conveyor.

9. A system for filling cooking pans with eggs comprising:
a) a reservoir for a plurality of deshelled intact whole eggs;
b) at least a first whole egg dispensing tube having an opening for dispensing said deshelled intact whole eggs from said reservoir into a plurality of cooking pans;
c) a first valve means connected between said reservoir and said whole egg dispensing tube for selectively dispensing said eggs through said dispensing tube;
d) an egg breaker for receiving a plurality of fresh eggs, and removing their shells without breaking their yolks or separating their yolks from their whites to form a plurality of deshelled intact whole eggs;
e) a chute connected between said egg breaker and said whole egg reservoir for transferring deshelled intact whole eggs from said breaker into said reservoir without damaging them;
f) a mixer for mixing deshelled eggs;
g) a transfer means connected between said egg breaker and said mixer means for transferring deshelled eggs to said mixer; and,
h) means to transfer mixed eggs from said mixer to a plurality of cooking pans.

* * * * *